United States Patent
Schlipf et al.

(10) Patent No.: US 12,351,319 B2
(45) Date of Patent: Jul. 8, 2025

(54) HEATED LEADING-EDGE STRUCTURE FOR AN AIRCRAFT

(71) Applicant: Airbus Operations GmbH, Hamburg (DE)

(72) Inventors: Bernhard Schlipf, Hamburg (DE); Florian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/512,706

(22) Filed: Nov. 17, 2023

(65) Prior Publication Data

US 2024/0166357 A1    May 23, 2024

(30) Foreign Application Priority Data

Nov. 17, 2022  (EP) ..................................... 22208198

(51) Int. Cl.
  B64D 15/04 (2006.01)
  B64C 3/14 (2006.01)

(52) U.S. Cl.
  CPC ........ B64D 15/04 (2013.01); *B64C 2003/146* (2013.01)

(58) Field of Classification Search
  CPC ........................... B64D 15/04; B64C 2003/146
  See application file for complete search history.

(56) References Cited

U.S. PATENT DOCUMENTS

2012/0318922 A1 *  12/2012  Saito .......................... B64C 3/28
                                                       244/134 B
2022/0306301 A1 *   9/2022  Schlipf .................. B64D 15/12

FOREIGN PATENT DOCUMENTS

CN       114261523 A    4/2022
EP         4063272 A1    9/2022

OTHER PUBLICATIONS

European Search Report for corresponding European Patent Application No. 22208198.6 dated Apr. 19, 2023; priority document.

* cited by examiner

*Primary Examiner* — Justin M Benedik
(74) *Attorney, Agent, or Firm* — Greer, Burns & Crain, Ltd.

(57) ABSTRACT

A heated leading-edge structure for an aircraft includes a leading-edge panel having an outer surface configured to be contacted by an ambient flow, and an inner surface opposite the outer surface, a rear panel arranged at least partially arranged at a distance to the inner surface, a closed chamber inside the leading-edge structure, a heating device attached inside the chamber, and an air conveying device in fluid communication with the heating device. The air conveying device is configured to convey air from inside the chamber through the heating device to be heated and returned to the chamber, such that a circulating flow of heated air is created inside the chamber.

15 Claims, 2 Drawing Sheets

HEATED LEADING-EDGE STRUCTURE FOR AN AIRCRAFT

CROSS-REFERENCES TO RELATED APPLICATIONS

This application claims the benefit of the European patent application No. 22208198.6 filed on Nov. 17, 2022, the entire disclosures of which are incorporated herein by way of reference.

FIELD OF THE INVENTION

The invention relates to a heated leading-edge structure for an aircraft, a wing for an aircraft and an aircraft.

BACKGROUND OF THE INVENTION

Modern civil aircraft mostly have a de-icing or anti-icing functionality integrated into leading-edge regions of their wings, which may comprise high-lift devices such as movable slats. A common way to implement an anti-icing function into slats is by providing an inflow of engine bleed air at an elevated temperature into the slat body. The bleed air is supplied to so-called piccolo tubes, from which the bleed air is ejected and impinges onto an inner surface of the slat to heat up its leading-edge. A disadvantage of this principle lies in a complex moveable interface required for the bleed air system extending between a fixed leading-edge region and the movable slat body. Also, several bleed air tubes need to be connected between consecutive slat bodies, which thus leads to a further increased installation effort. Still further, this principle may require a certain monitoring, which includes measuring pressure and temperature inside the structure.

Another way to heat up slat leading edges may include integration of an electrical heating mat into a composite material of a slat cover. However, a production process for the cover is rather complex. In case of a malfunction, a repair is quite complex or impossible and the whole cover needs to be replaced.

SUMMARY OF THE INVENTION

It is an object of the invention to propose an alternative heated leading-edge structure or an alternative heating device, which reduces the complexity, the manufacturing costs and the monitoring effort and improves the maintainability, but leads at least to the same heat generation.

A heated leading-edge structure for an aircraft is proposed, comprising a leading-edge panel having an outer surface configured to be contacted by an ambient flow, and an inner surface opposite the outer surface, a rear panel arranged at least partially arranged in a distance to the inner surface, a closed chamber inside the leading-edge structure, a heating device attached inside the chamber, and an air conveying device in fluid communication with the heating device, wherein the air conveying device is configured to convey air from inside the chamber through the heating device to be heated and returned to the chamber, such that a circulating flow of heated air is created inside the chamber.

The heated leading-edge structure may be a part of a wing, of a horizontal tailplane, of a vertical tailplane, of an engine nacelle or any other flow body of an aircraft that is exposed to an air flow. If the leading-edge structure is a part of a wing, it may be a fixed part of a wing and/or a movable part of a wing, such as a slat or another type of movable lift increasing flow body that belongs to a high lift system or another kind of flow enhancing device.

A gist of the invention lies in providing a simple, separated and locally integratable heating device in a respective leading-edge structure, which in combination with an air conveying device leads to producing a stream of air with an elevated temperature. The heated air flows along at least a part of the inner surface to heat up the leading-edge structure. The individual heating devices may exemplarily be supplied with electrical power and are simple to install. The heating devices and the air conveying devices are not integrated into the shell of the leading-edge structure, such that they are also simple to repair or replace. In case of a malfunction they may simply be replaced during a turn-around time or in an over-night service. It may also be possible to include several heating devices inside a leading-edge structure, which would enable a safe operation even in case of a malfunction of one of the heating devices. The availability of the de-icing or anti-icing function is thus significantly higher than with common solutions. Heating devices of several adjacent movable leading-edge devices can be provided independent from each other, such that complex interfaces can be eliminated. The complexity is clearly decreased in comparison with common solutions, which not only reduces the manufacturing costs, but also leads to an improved maintainability.

The leading-edge panel is arranged on the front side of the leading-edge structure and comprises a leading edge that is directed into the air flow. The leading edge may be determined by a plurality of neighboring stagnation points at at least one operational state of the respective aircraft, to which the leading-edge structure is attached. The leading-edge panel is mainly designed according to the aerodynamic requirements and may comprise two spanwise edges arranged at a distance to the leading edge to delimit the structural extension of the leading-edge panel. The leading-edge panel extends between these edges preferably in a curved shape, at least in an extended position.

The rear panel is preferably arranged on a downstream side of the leading-edge structure and may be connected to at least one of the spanwise edges of the leading-edge panel and/or a spar arranged inside the leading-edge structure and/or another component of the leading-edge structure. The leading-edge structure may for example comprise a separate trailing edge profile, to which one section of the rear panel may be attached. Several other variants are conceivable and readily apparent for the skilled person. If the leading-edge structure is a movable slat, the rear panel may be shaped to conform the shape of a fixed wing part.

Inside the leading-edge structure, the closed chamber is created. The closed chamber is in fluid communication with at least a part of the leading-edge panel, such that hot air flowing inside the chamber is able to contact the inner surface of the leading-edge panel. The shape and size of the chamber depends may vary depending on the embodiment. It is conceivable that the chamber is associated with at least a leading-edge region of the leading-edge panel, i.e., a region that includes the leading edge and further downstream directly covers or delimits the chamber. The size and location of the leading-edge panel that is heated depends on the actual design of the leading-edge structure. It is, however, conceivable to let the heated area extend up to a chordwise position of 50% or further, measured from the leading edge.

The chamber may be delimited by the leading-edge panel and the rear panel. However, additional delimiting walls inside the leading-edge structure may be used to concentrate the volume, through which heated air circulates, to locations, where heat is required.

According to the invention, instead of using a heater mat integrated into the leading-edge panel or a bleed air system with a piccolo tube and respective interfaces, a separate heating device is used, which is simply attached inside the chamber. Thus, the heating device is attached to the inner surface of the leading-edge panel, an inner surface of the rear panel, a structural element inside the leading-edge structure or any other suitable attachment location. The heating device simply heats air that is conveyed by the air conveying device through the heating device and returns the heated air into the volume of the chamber. Inside the chamber, a circulating flow of heated air is created, which is ejected into the limited volume of the chamber, impinges the inner surface of the leading-edge panel and flows back to the air conveying device due to a pressure differential created by it. Thus, when the air conveying device operates, the air enclosed inside the leading-edge structure is continuously transporting heat to the leading-edge panel to provide for the anti-icing function.

In an advantageous embodiment, the heating device comprises an electrical heater. The electrical heater may comprise one or more heating coils that are connectable to an electric power source. The electrical heater may thus be based on a resistive heating. However, other variants are conceivable, in particular all commonly commercially available variants that are able to produce a sufficient heating power. When including an electrical heater into a leading-edge structure, it may be beneficial to design the heating coils or other heat producing elements in a vibration-proof manner, such that continuous vibrations during the operation of the respective aircraft do not damage the heating producing elements. For example, if heating coils are used, they may comprise rigid conductors that are firmly held inside the heating device.

In an advantageous embodiment, the air conveying device comprises a fan and an electric motor. The fan may be arranged inside an enclosure, such as a pipe or a tube section, to focus the generated airflow. It is conceivable that also the heating device has an enclosure, which conforms to the shape of the enclosure of the fan. When using an electric motor attached to the fan, it is preferred that the motor does not block the flow of air from inside the chamber into the fan. For example, the electric motor may comprise an outer diameter that is clearly smaller than the outer diameter of the fan. However, the motor may also comprise a ring shape that has a sufficiently large central hole, through which air may enter the fan.

The electric motor and/or the electrical heating device may be coupled with a control unit that is configured to control the amount and temperature of the heated air circulated inside the chamber. For example, in certain operational states of the respective aircraft, more heat is required than in other operational states. The control unit may be coupled with a flight control system or a flight management system inside the respective aircraft in order to adjust the delivered amount of heated air and its temperature to the respective operational state of the aircraft.

In an advantageous embodiment, the heated leading-edge structure further comprises an internal flow guiding device, which extends along at least a part of the inner surface in a distance thereto to form a flow channel between the inner surface and the internal flow guiding device, wherein air conveying device and the heating device are arranged to convey heated air into the flow channel transverse to a spanwise direction. The internal flow guiding device may be arranged to follow the inner surface in a chordwise direction. Air may be conveyed into the flow channel to flow along the chordwise direction to locations downstream of the leading edge. The internal flow guiding device may comprise a cross-sectional profile that is at least substantially closed, i.e., forming a separate closed or substantially closed volume inside the leading-edge structure itself. However, the flow guiding device may also be provided in the form of a guiding plate or guiding sheet that extends from a first chordwise location to a second chordwise location. The intermediate space between the inner surface of the leading-edge panel and the flow guiding device acts as the flow channel, along which the heated air is considered to flow. It is to be understood that the air conveying device and the heating device are aligned in a way that heated air enters the flow channel preferably at a location near the leading-edge to flow downstream from there.

In an advantageous embodiment, a plurality of local distances between the internal flow guiding device and the inner surface along a flow direction of the heated air are individually dimensioned to adjust local flow velocities of the heated air and thus local heat transfer coefficients. Thus, by simply choosing the local distances between the internal flow guiding device and the inner surface of the leading-edge panel through shaping the flow guiding device, individual local heat transfer coefficients can be set to control the local transfer of heat from the heated air into the leading-edge panel.

In an advantageous embodiment, the distance between the internal flow guiding device at a rear part of the chamber is smaller than at a central part of the chamber. Thus, the velocity of the heated air at a rearward part of the flow channel is clearly higher than at a central part of the flow channel. Hence, the transfer coefficient in this region may be higher than at the central part.

In an advantageous embodiment, the air conveying device is sealed against the rear panel and the internal flow guiding device to urge the airflow into the flow channel. This improves the flow of air into the channel. The circulating flow may then be controlled to, e.g., circulate in chordwise manner and parasitic flow at sides of the fan or the heating device can be substantially avoided.

In an advantageous embodiment, the heated leading-edge structure further comprising an internal shield extending along a substantially spanwise direction from an upper part of the inner surface to a lower part of the internal surface to form the chamber at a leading-edge region of the heated leading-edge structure, wherein the heating device and the air conveying device are configured to convey heated air in a substantially spanwise direction inside the chamber. Thus, a full walled chamber directly along the leading-edge is created. The flow direction in such a chamber is substantially spanwise and the air conveying device and the heating device should then be oriented likewise.

In an advantageous embodiment, the heated leading-edge structure comprises a plurality of air conveying devices and heating devices distributed in a spanwise direction in the chamber. This allows one to increase the length of a flow path for heated air inside the leading-edge structure. For example, two or more air conveying devices may be provided at a distance to each other distributed along the flow path. Thus, the flow path is extended and local introductions of heat to the air is provided, such that the temperature of the heated air along the flow path can be maintained in a more or less close range. For example, heated air that exits a first heating device will be cooled by the leading-edge panel to be heated and its flow velocity may decrease. However, it will be heated again by a second heating device and accelerated by a second air conveying device. If more heating devices and air conveying devices are provided, this process will be repeated at each further air conveying device and heating device.

In an advantageous embodiment, the plurality of air conveying devices and heating devices are operable independently from each other. Thus, spanwise heat distribution and/or the amount of heat can be controlled.

In an advantageous embodiment, at least a part of the rear panel comprises a thermal insulation. Thus, the transfer of heat from the heated air is primarily provided along the leading-edge panel and the efficiency is increased. The rear panel may either be equipped with separate thermal insulation layers attached to an inner surface of the rear panel, or the rear panel itself may comprise an integrated thermal insulation.

The invention further relates to a wing for an aircraft, comprising at least one heated leading-edge structure according to the above.

In an advantageous embodiment, the at least one heated leading-edge structure comprises a fixed leading-edge structure and/or a movable leading-edge structure. For example, one or several movable slats may be provided, which each are designed as a leading-edge structure according to the above.

Still further, the invention relates to an aircraft, comprising at least one wing according to the above and/or at least one heated leading-edge structure according to the above.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show.

DETAILED DESCRIPTION OF THE PREFERRED EMBODIMENTS

Figure 1:
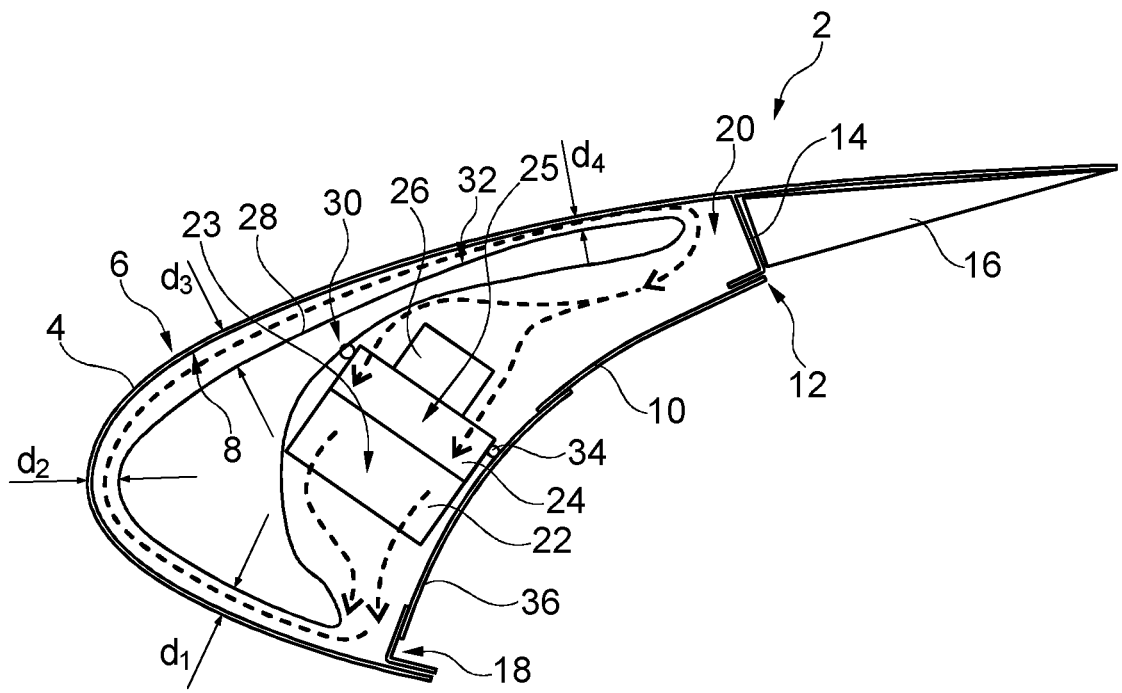
FIG. 1 shows a schematic sectional view of a heated leading-edge structure according to a first embodiment.

FIG. 1 shows a heated leading-edge structure 2 for an aircraft. In this example, the leading-edge structure 2 is provided in the form of a leading-edge slat that is movably supported on a leading edge of the wing (see FIG. 5). The leading-edge structure 2 comprises a leading-edge panel 4 having an outer surface 6 and an inner surface 8. The outer surface 6 is configured to be contacted by an ambient flow that arises during the operation of the aircraft, to which the structure 2 is attached.

In a distance to the inner surface 8, a rear panel 10 is arranged. A rear edge 12 of the rear panel 10 is attached to a spar 14 arranged in the structure 2. The leading-edge panel 4 extends over the spar 14 and together with the spar 14 encloses a trailing-edge component 16. A rear end 18 of the rear panel 10 is attached to the leading-edge panel 4. Thus, the leading-edge panel 4, the rear panel 10 and the spar 14 create a closed chamber 20 inside the structure 2.

A heating device 22 in the form of electrical heater is provided inside the closed chamber 20. An air conveying device 24 in the form of a fan is directly attached to the heating device 22 and is driven by an electric motor 26, which in turn is attached to the fan 24 at a side facing away from the heating device 22. The fan 24 and the heating device 22 each exemplarily comprise an enclosure 23 and 25 in the form of a tube section. The diameter of the electric motor 26 is smaller than the outer diameter of the fan 24, such that air can enter a rear side of the fan 24 to be conveyed into and through the heating device 22.

Furthermore, a flow guiding device 28 is provided inside the structure 2, wherein the flow guiding device 28 is realized in the form of a sheet material that extends in the chordwise direction along the inner surface 8. As shown in this sectional view, the flow guiding device 28 comprises a cross-sectional profile that is completely closed. Thus, the flow guiding device 28 forms a separate closed volume 30 inside the chamber 20. As indicated by pairs of arrows, a distance between the flow guiding device 28 and the inner surface 8 varies. Here, a first distance d1, a second distance d2, a third distance d3 and a fourth distance d4 are shown. The first and second distances d1 and d2 are substantially identical. The third distance d3 is slightly larger than d1 and d2. The fourth distance d4 is clearly smaller than all other distances d1 to d3.

By driving the fan 24, air from inside the closed chamber 20 is conveyed through the heating device 22 and is ejected into a flow channel 32 between the flow guiding device 28 and the inner surface 8 of the leading-edge panel 4. Thereby, heat is transported along the inner surface 8 and is transferred into the leading-edge panel 4.

By providing the different distances d1 to d4, the flow velocities in the flow channel 32 between the flow guiding device 28 and the leading-edge panel 4 vary. Depending on the respective local flow velocity, the heat transfer coefficient for transferring heat into the leading-edge panel 4 is created. For creating a suitably shaped flow guiding device 28, at first the individual heat demands for an anti-icing function for the leading-edge panel 4 are assessed. Knowing these, individual heat transfer coefficients can be determined, which in turn lead to the determination of the different distances d1 to d4, which directly influence the shape of the flow guiding device 28.

Since the chamber 20 is closed, the heating device 22 does not need to heat up ambient air to a desired level, but uses a defined volume of air in a circulating manner. The air conveying device 24 is exemplarily sealed against the rear panel 10 and the flow guiding device 28 through a sealing body 34, which may extend in a spanwise direction of the structure 2 and comprises a through-hole, into which the air conveying device 24 may be integrated. Thus, a focused circulating flow of air can be generated.

For maintaining the heating device 22, the fan 24 and the electric motor 26, an access cover 36 is provided in the rear panel 10. The rear panel 10 may be removed to repair or replace one of the components 22, 24 or 26. Hence, a very simple maintenance can be provided.

Figure 2:
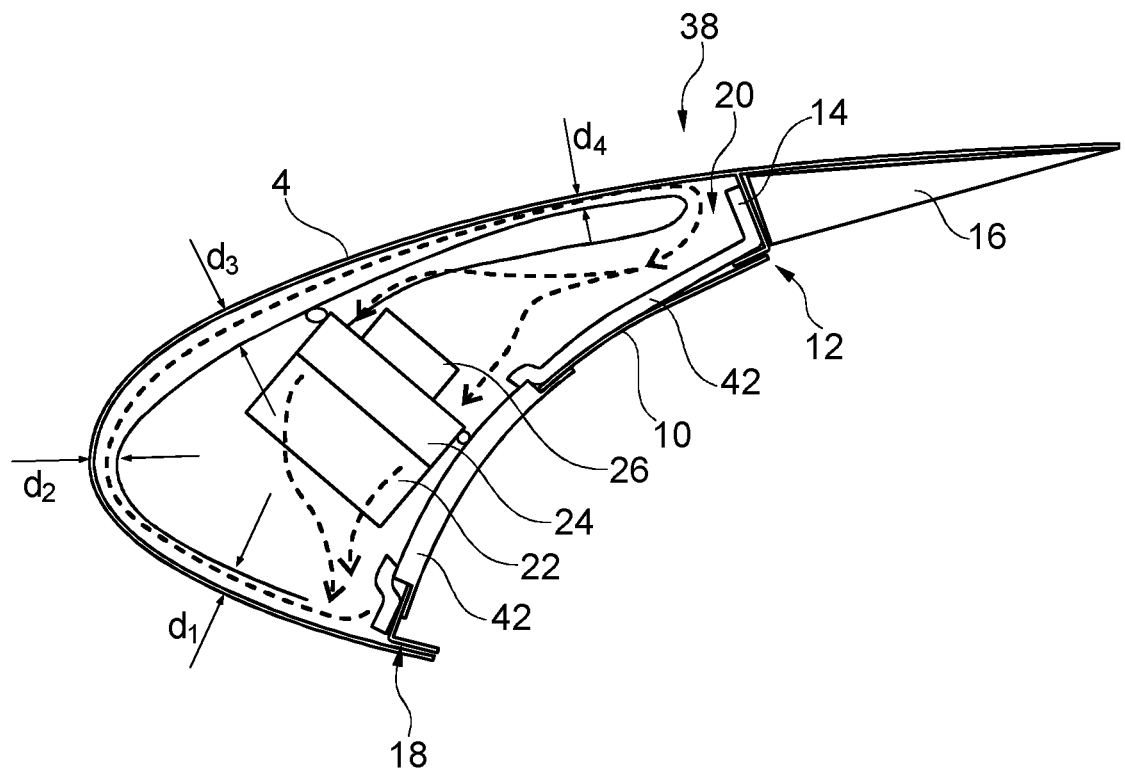
FIG. 2 shows a schematic sectional view of a heated leading-edge structure according to a second embodiment.

In FIG. 2, a modified leading-edge structure 38 is shown, in which a flow guiding device 40 is provided, which does not form a separate closed volume. Instead, the flow guiding device 40 is provided in the form of a flat, bent sheet material that has a forward edge and a rearward edge, wherein the flow guiding device extends along the inner surface 8 of the leading-edge panel 4. The air conveying device 24 is arranged between the flow guiding device 40 and the rear panel 10 and conveys air through the heating device 22 into the flow channel 32, which is substantially equal to the flow channel 32 of the exemplary embodiment in FIG. 1.

In addition, insulation layers 42 are arranged on the inner side of the rear panel 10 and the access cover 36, such that heat of the heated air substantially only heats up the leading-edge panel 4.

Figure 3:
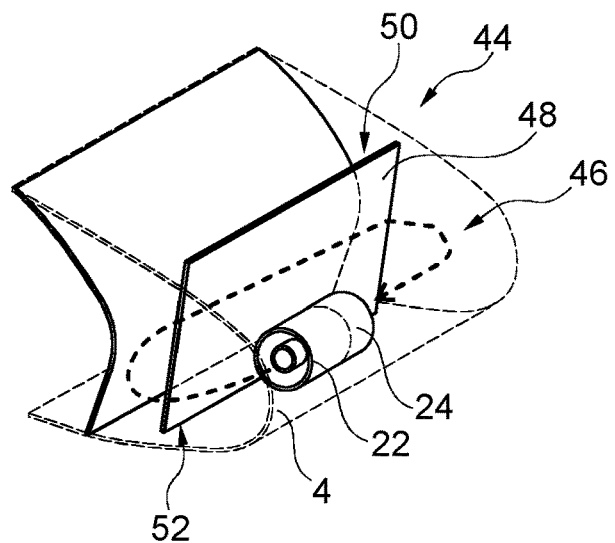
FIG. 3 shows a schematic spatial view of a heated leading-edge structure according to a third embodiment.

FIG. 3 shows a leading-edge structure 44, in which a chamber 46 is created between the leading-edge panel 4 and an internal shield 48, which extends along a substantially spanwise direction from an upper part 50 of the inner surface 8 and a lower part 52 of the inner surface 8. The chamber 46 thus substantially extends along a spanwise direction as well. Inside this chamber 46, a circulating flow of heated air is generated by the heating device 22 and the air conveying device 24, which are oriented in accordance with the orientation of the chamber 46, i.e., they deliver heated air along the spanwise direction. It is conceivable that the heated air flow is provided locally in a single rib bay, as illustrated in FIG. 3.

Figure 4:
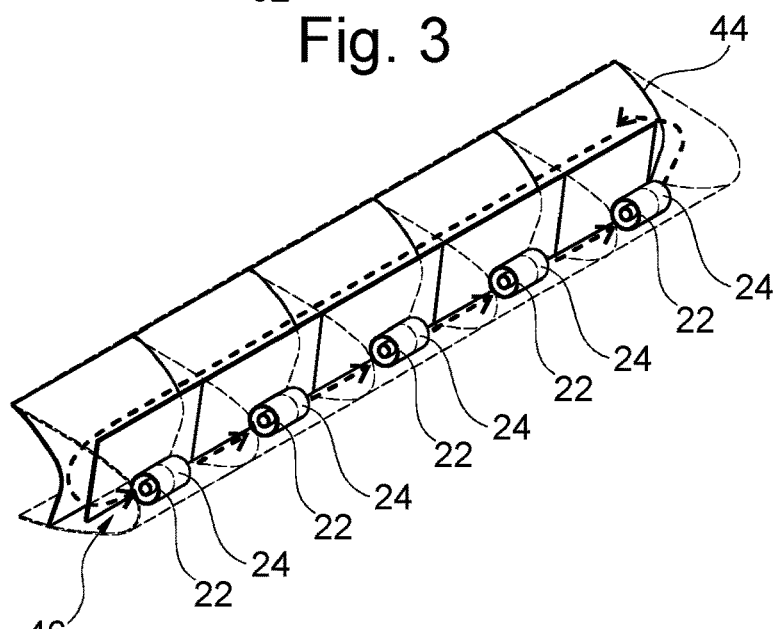
FIG. 4 shows a plurality of the leading-edge structures of FIG. 3 in a serial connection.

In FIG. 4, a series of heating devices 22 and air conveying devices 24 is provided, which are distributed along a spanwise line. Here, a distance between consecutive arrangements of heating devices 22 and air conveying devices 24 is provided and all air conveying devices 24 together provide a common flow of heated air. Hence, the heated air flow is created along several rib sections. It is conceivable that the heating devices 22 and/or the air conveying devices 24 are controlled individually.

Figure 5:
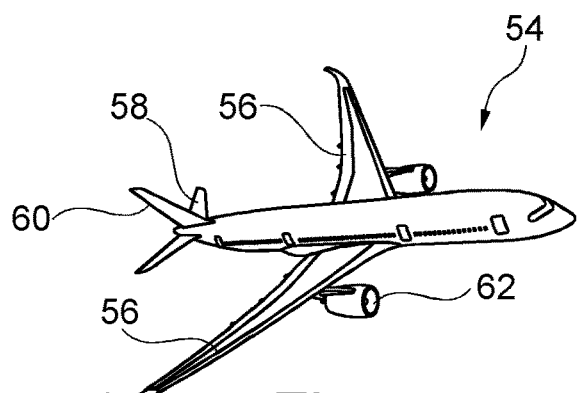
FIG. 5 shows an aircraft.

FIG. 5 shows an aircraft 54 having wings 56, a horizontal tailplane 58, and a vertical tailplane 60. For example, the aircraft 54 has leading-edge structures 2, 38, or 44 at a leading edge of the wings 56 and/or the leading edge of the horizontal tailplane 60 and/or the leading edge of the vertical tailplane 60 and/or at an engine nacelle 62.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 heated leading-edge structure
4 leading-edge panel
6 outer surface
8 inner surface
10 rear panel
12 rear edge
14 spar
16 trailing-edge component
18 rear end
20 closed chamber
22 heating device
23 enclosure
24 air conveying device
25 enclosure
26 electric motor
28 flow guiding device
30 closed volume
32 flow channel
34 sealing body
36 access cover
38 leading-edge structure
40 flow guiding device
42 insulation layer
44 leading-edge structure
46 closed chamber
48 internal shield
50 upper part
52 lower part
54 aircraft
56 wing
58 horizontal tailplane
60 vertical tailplane
62 engine
d1, d2, d3, d4 local distance

The invention claimed is:

1. A heated leading-edge structure for an aircraft, comprising:
    a leading-edge panel having an outer surface configured to be contacted by an ambient flow, and an inner surface opposite the outer surface,
    a rear panel at least partially arranged at a distance to the inner surface,
    a closed chamber inside the leading-edge structure,
    a heating device attached inside the chamber, and
    an air conveying device in fluid communication with the heating device,
    wherein the air conveying device is configured to convey air from inside the chamber through the heating device to be heated and returned to the chamber, such that a circulating flow of heated air is created inside the chamber,
    wherein:
        the heating device comprises an electrical heater,
        the air conveying device comprises a fan and an electric motor, or
        both.

2. The heated leading-edge structure according to claim 1, further comprising an internal flow guiding device, which extends along at least a part of the inner surface in a distance thereto to form a flow channel between the inner surface and the internal flow guiding device,
    wherein air conveying device and the heating device are arranged to convey heated air into the flow channel transverse to a spanwise direction.

3. The heated leading-edge structure of claim 2, wherein a plurality of local distances between the internal flow guiding device and the inner surface along a flow direction of the heated air are individually dimensioned to adjust local flow velocities of the heated air and thus local heat transfer coefficients.

4. The heated leading-edge structure of claim 2, wherein the distance between the internal flow guiding device at a rear part of the chamber is smaller than at a central part of the chamber.

5. The heated leading-edge structure of claim 2, wherein the air conveying device is sealed against the rear panel and the internal flow guiding device to urge an airflow into the flow channel.

6. The heated leading-edge structure of claim 1, further comprising an internal shield extending along a substantially spanwise direction from an upper part of the inner surface to a lower part of the inner surface to form the chamber at a leading-edge region of the heated leading-edge structure, wherein the heating device and the air conveying device are configured to convey heated air in a substantially spanwise direction inside the chamber.

7. The heated leading-edge structure of claim 1, further comprising a plurality of air conveying devices and heating devices distributed in a spanwise direction in the chamber.

8. The heated leading-edge structure of claim 7, wherein the plurality of air conveying devices and heating devices are operable independently from each other.

9. The heated leading-edge structure of claim 1, wherein at least a part of the rear panel comprises a thermal insulation.

10. A wing for an aircraft, comprising at least one heated leading-edge structure of claim 1.

11. The wing according to claim 10, wherein the at least one heated leading-edge structure comprises a fixed leading-edge structure and/or a movable leading-edge structure.

12. An aircraft, comprising at least one wing of claim 10.

13. An aircraft, comprising at least one heated leading-edge structure of claim 1.

14. A heated leading-edge structure for an aircraft, comprising:
a leading-edge panel having an outer surface configured to be contacted by an ambient flow, and an inner surface opposite the outer surface,
a rear panel at least partially arranged at a distance to the inner surface,
a closed chamber inside the leading-edge structure,
a heating device attached inside the chamber,
an air conveying device in fluid communication with the heating device,
wherein the air conveying device is configured to convey air from inside the chamber through the heating device to be heated and returned to the chamber, such that a circulating flow of heated air is created inside the chamber, and
an internal shield extending along a substantially spanwise direction from an upper part of the inner surface to a lower part of the inner surface to form the chamber at a leading-edge region of the heated leading-edge structure,
wherein the heating device and the air conveying device are configured to convey heated air in a substantially spanwise direction inside the chamber.

15. A heated leading-edge structure for an aircraft, comprising:
a leading-edge panel having an outer surface configured to be contacted by an ambient flow, and an inner surface opposite the outer surface,
a rear panel at least partially arranged at a distance to the inner surface,
a closed chamber inside the leading-edge structure,
a heating device attached inside the chamber,
an air conveying device in fluid communication with the heating device,
wherein the air conveying device is configured to convey air from inside the chamber through the heating device to be heated and returned to the chamber, such that a circulating flow of heated air is created inside the chamber, and
an internal flow guiding device, which extends along at least a part of the inner surface in a distance thereto to form a flow channel between the inner surface and the internal flow guiding device,
wherein air conveying device and the heating device are arranged to convey heated air into the flow channel transverse to a spanwise direction, and
wherein the air conveying device is sealed against the rear panel and the internal flow guiding device to urge an airflow into the flow channel.

* * * * *